(12) United States Patent
George

(10) Patent No.: US 7,102,302 B2
(45) Date of Patent: Sep. 5, 2006

(54) WAVEFORM GENERATOR FOR CONTROLLING AN ELECTRON BEAM IN A CATHODE RAY TUBE

(75) Inventor: John Barrett George, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/511,836

(22) PCT Filed: Apr. 21, 2003

(86) PCT No.: PCT/US03/12178

§ 371 (c)(1),
(2), (4) Date: Oct. 19, 2004

(87) PCT Pub. No.: WO03/090450

PCT Pub. Date: Oct. 30, 2003

(65) Prior Publication Data

US 2005/0212452 A1    Sep. 29, 2005

Related U.S. Application Data

(60) Provisional application No. 60/374,280, filed on Apr. 19, 2002.

(51) Int. Cl.
*G09G 1/28* (2006.01)
*G09G 1/04* (2006.01)

(52) U.S. Cl. .................. 315/368.21; 315/382

(58) Field of Classification Search ........... 315/368.18, 315/368.21, 382, 382.1, 399, 408; 348/325–326, 348/380
See application file for complete search history.

(56) References Cited

U.S. PATENT DOCUMENTS 3,757,162 A    9/1973    Johnson .................. 315/276

(Continued)

FOREIGN PATENT DOCUMENTS

EP    1 003 331 A    5/2000

(Continued)

OTHER PUBLICATIONS

Toshiba TA1317AN, Deflection Processor IC for TV, Sep. 6, 2002, pp. 1-59.

(Continued)

*Primary Examiner*—Thuy Vinh Tran
(74) *Attorney, Agent, or Firm*—Joseph J. Laks; Harvey D. Fried; Christine Johnson

(57) ABSTRACT

A parabola generator for providing dynamic correction includes a capacitor source of a parabolic input signal at a frequency related to a horizontal deflection frequency coupled to a first terminal of the capacitor. A diode switch is coupled to a voltage at a reference level and to a second terminal of the capacitor for periodically clamping a peak level of a signal developed at the second terminal. A transistor switch is responsive to a periodic switch control signal and coupled to the second terminal of the capacitor for periodically clamping a signal applied from the second terminal, during retrace, for removing a parasitic parabolic voltage portion to generate a dynamic correction signal. The dynamic correction signal is coupled to the cathode ray tube to vary a field in a beam path of an electron beam of the cathode ray tube for providing dynamic correction.

12 Claims, 4 Drawing Sheets

U.S. PATENT DOCUMENTS

| | | | |
|---|---|---|---|
| 4,184,104 A | | 1/1980 | Shouse, Jr. .................. 315/371 |
| 4,216,392 A | * | 8/1980 | Valkestijn ................... 327/125 |
| 4,500,816 A | | 2/1985 | Murphy .................. 315/368.18 |
| 4,560,910 A | | 12/1985 | Midland ..................... 315/382 |
| 5,034,664 A | * | 7/1991 | Fernsler et al. ............. 315/370 |
| 5,162,705 A | * | 11/1992 | Golik ........................ 315/382 |
| 5,258,828 A | | 11/1993 | Sano et al. ................... 358/29 |
| 5,341,071 A | | 8/1994 | George ................... 315/382.1 |
| 5,430,358 A | * | 7/1995 | George ....................... 315/382 |
| 5,486,741 A | | 1/1996 | George ....................... 315/382 |
| 5,532,558 A | | 7/1996 | George .................... 315/382.1 |
| 5,663,617 A | | 9/1997 | Kobayashi .................. 315/382 |
| 5,705,900 A | | 1/1998 | Hwang ....................... 315/382 |
| 5,747,948 A | * | 5/1998 | George .................. 315/368.18 |
| 5,783,913 A | | 7/1998 | George ....................... 315/371 |
| 5,977,726 A | | 11/1999 | Shishido ..................... 315/382 |
| 6,256,074 B1 | | 7/2001 | Wilber et al. ................ 348/806 |
| 6,300,731 B1 | * | 10/2001 | George ....................... 315/382 |
| 8,297,600 | | 10/2001 | George ....................... 315/386 |
| 6,504,326 B1 | | 1/2003 | Huckriede ................... 315/382 |
| 6,690,124 B1 | * | 2/2004 | Fernsler et al. ............. 315/382 |

FOREIGN PATENT DOCUMENTS

WO      WO 00/38411 A     6/2000

OTHER PUBLICATIONS

TDA8145, TV East/West Correction Circuit For Square Tubes, Oct. 1998, pp. 1-5.

SGS-Thomson Microelectronics, TDA8146, East/West Correction For Rectangular TV-Tubes, May 1993, pp.1-5.

Copy of Search Report Dated Jun. 20, 2003.

* cited by examiner

WAVEFORM GENERATOR FOR CONTROLLING AN ELECTRON BEAM IN A CATHODE RAY TUBE

This application claims the benefit, under 35 U.S.C. § 365 of International Application PCT/US03/12178, filed Apr. 21, 2003, which was published in accordance with PCT Article 21(2) on Oct. 30, 2003 in English and which claims the benefit of U.S. Provisional Patent Application No. 60/374,280, filed Apr. 19, 2002.

FIELD OF THE INVENTION

This invention relates to a waveform generator for controlling an electron beam in a cathode ray tube (CRT), and more particularly to a parabola generator for dynamic focus voltage.

BACKGROUND OF THE INVENTION

It is known to generate a dynamic focus voltage that is applied to a focus electrode of a cathode-ray tube (CRT) for changing the focus of the CRT as the length of the beam path changes during horizontal and vertical scanning. For example, U.S. Pat. No. 6,300,731, entitled DYNAMIC FOCUS VOLTAGE AMPLITUDE CONTROLLER, in the name of John Barrett George, describes such an arrangement. There, a parabolic horizontal rate voltage is applied to a focus voltage amplifier.

A data sheet of a deflection processor integrated circuit (IC) TA1317AN published by Toshiba Corporation describes generation of a parabola waveform for horizontal dynamic focus. The peak-to-peak amplitude of the parabola waveform is selectable such that the level of the parabola at the center of horizontal trace remains the same at the different selections of the peak-to-peak amplitude. Whereas, at the end of trace, the peak level of the parabola is different at the different selections of the peak-to-peak amplitude.

Also, between the end of one trace and the beginning of the next trace, a parasitic or undesirable waveform portion is generated in IC TA1317AN. When applied to the focus voltage amplifier, this parasitic waveform portion, that occurs, during retrace, may produce an undesirable distortion in a portion of the dynamic focus voltage that occurs outside retrace, in a visible portion of the horizontal scan line, near the end of trace. It may be desirable to eliminate the parasitic waveform portion without disturbing the portion of the dynamic focus voltage that occurs in the vicinity of the end of trace. It may also be desirable to do so in a manner that preserves the ability to adjust the peak-to-peak amplitude of the parabola waveform.

In carrying out an aspect of the invention, a first parabola waveform is capacitively coupled via a capacitor to a first semiconductor switch responsive to a first reference voltage and forming a clamp. The clamp generates a second parabola waveform having a peak level, at the end of trace, that is determined by the first reference voltage. The clamping operation of the first semiconductor switch causes the capacitor to charge in a manner to provide level shifting. Advantageously, at selectively different peak-to-peak amplitudes of the first parabola waveform, the peak amplitude of the second parabola waveform remains the same. Thus, the level shifting, advantageously, preserves the ability to select different peak-to-peak amplitudes of the second parabola waveform. A second semiconductor switch, responsive to a periodic switch control signal and to a second reference voltage, replaces in the second parabola waveform an undesirable waveform portion of the first parabola waveform that occurs between the end of trace and the beginning of the immediately following trace of the second parabola waveform with a constant level. The constant level is determined in accordance with the second reference voltage. Thereby, the undesirable waveform portion is, advantageously, removed.

SUMMARY OF THE INVENTION

A waveform generator, embodying an inventive feature includes a source of a periodic input correction signal. A first semiconductor switch is coupled to a capacitor and is responsive to a signal at a first reference level for developing a direct current voltage in the capacitor that level shifts the periodic, input correction signal. The direct current voltage in the capacitor is level shifted by an amount determined in accordance with the first reference level. A second semiconductor switch is responsive to the level shifted, periodic input correction signal and to a periodic switch control signal for generating a periodic output dynamic correction signal. The periodic output dynamic correction signal has a frequency related to a deflection frequency and a waveform portion, controlled by an operation of the second semiconductor switch. The waveform portion occurs, during a corresponding portion of a period of the output dynamic correction signal. The dynamic correction signal is coupled to a cathode ray tube to vary a field in a beam path of an electron beam of the cathode ray tube for providing dynamic correction.

BRIEF DESCRIPTION OF THE DRAWING

FIG. 1b is a more detailed diagram of a portion of the dynamic focus and high voltage-related focus signal combiner of FIG. 1a;

DESCRIPTION OF THE INVENTION

Figure 1A:
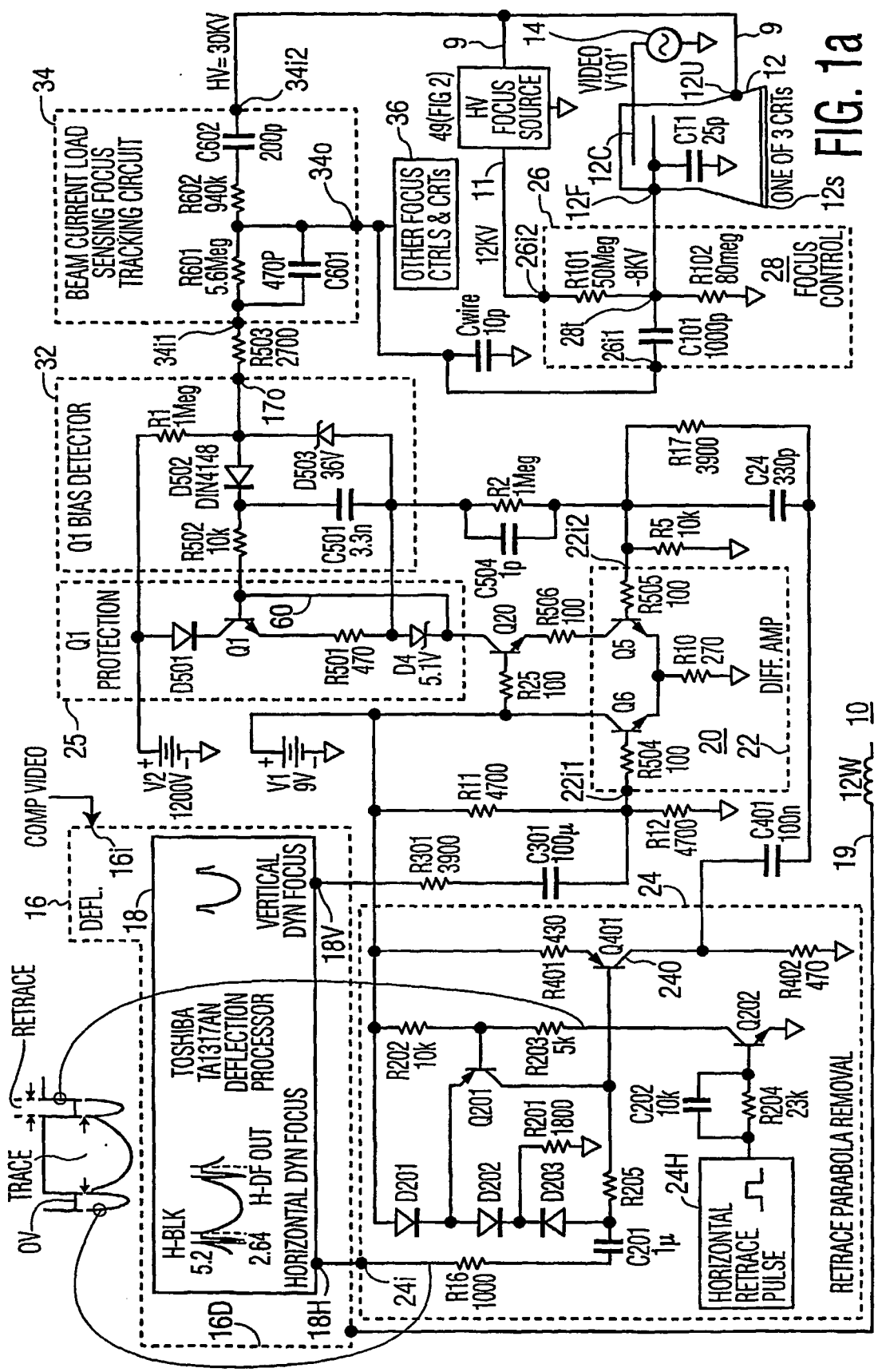
FIG. 1a is a simplified diagram in block and schematic form illustrating inter alia a dynamic focus and high voltage-related focus signal combiner and a parabola voltage generating circuit, according to an aspect of the invention.

In FIG. 1a, a television apparatus designated generally as 10 includes at lower right a cathode-ray tube (CRT) or kinescope 12 which includes a screen 12s, an ultor or high voltage (anode) terminal 12U, a focus terminal 12F, and a cathode 12C. Cathode 12C of CRT 12 is illustrated as being connected to a source of image signal in the form of video source 14. As noted in FIG. 1a, CRT 12 may be one of three similar CRTs, as might be used, for example, in a projection television arrangement.

Figure 1B:
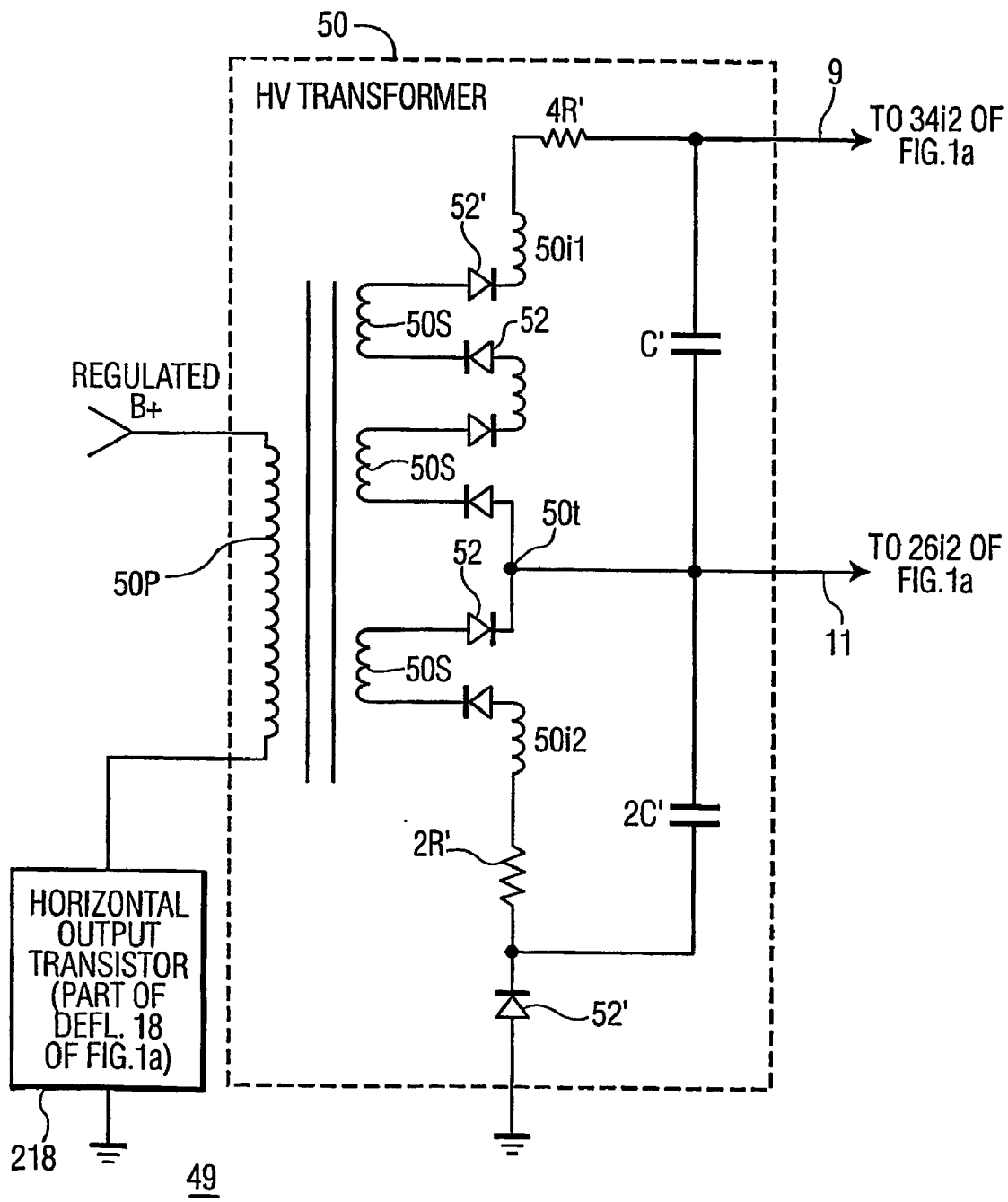

The ultor or high voltage terminal 12u of CRT 12 of FIG. 1a is connected by way of a conductor 9 to an ultor or high voltage and focus voltage source illustrated as a block 49. Block 49 is illustrated in more detail in FIG. 1b. In FIG. 1b, elements corresponding to those of FIG. 1a are designated by like reference numerals. Structure 49 of FIG. 1b includes an integrated high voltage/focus voltage transformer/rectifier arrangement designated generally as 50, which includes a primary winding 50p having one end connected to a source of regulated B+ and another end connected to a horizontal output transistor illustrated as a block 218, which is a part of deflection block 18 at upper left of FIG. 1a. Transformer 50 of FIG. 1b also includes a distributed secondary winding made up of secondary sections designated 50s, with a rectifier or diode, some of which are designated 52, located between each pair of secondary sections. The uppermost secondary winding 50s in transformer 50 is connected by way of the serial combination of an inductor 50i and a further rectifier or diode 52' to high voltage conductor 9, from which the high voltage is coupled to ultor terminal 12u of FIG. 1a. The lowermost secondary winding 50s of transformer 50 of FIG. 1b is connected by way of the series combination of an inductor 50i2 and a diode 52" to ground. Resistor 4R' represents the distributed resistance of the secondary windings 52 lying above tap 50, and a capacitor C' connected between transformer terminal 9 and tap 50t represents the distributed capacitance of the windings lying above tap 50t. Similarly, resistor 2R' represents the distributed resistance of windings 52 and inductor 50i2, lying below tap 50t of transformer 50, and capacitor 2C' represents the distributed capacitance. Tap 50t of transformer 50 of FIG. 1b is connected by way of a focus voltage conductor 11 to input terminal 26i2 of focus control 26 of FIG. 1a. Within focus control 26 of FIG. 1a, the focus voltage from transformer 50 is coupled to focus terminal 12F by means of a focus control 26 voltage divider designated as 28. Voltage divider 28 includes resistors R101 and R102, with a tap 28t therebetween. Tap 28t is connected to focus terminal 12F of CRT 12. Focus control 26 includes an input port 26i1 to which other focus signals may be applied.

Also in FIG. 1a, a deflection arrangement (Defl) illustrated at upper left as a block 16 receives composite (COMP) video or at least separated synchronization signals at a port 16i. Deflection arrangement 16 produces vertical and horizontal deflection signals, illustrated together as being generated at an output terminal 16o and applied by way of a path 19 to deflection windings, illustrated together as 12W, which is or are associated with the CRT 12, all as known in the art. Deflection arrangement 16 also includes a deflection processor 18, which for example is a Toshiba TA1317AN deflection processor. Deflection processor 18 produces horizontal dynamic focus signals at an output port 18H, and vertical dynamic focus signals at an output port 18V.

A dynamic focus combining circuit and amplifier, designated generally as 20 in FIG. 1a, includes a differential amplifier 22 including NPN transistors Q5 and Q6, together with a common emitter resistor R10 and base resistors R504 and R505. Vertical dynamic focus signals from terminal 18V of deflection processor 18 are applied by way of an AC-gain determining resistor R301 and a dc blocking capacitor C301 to a first input port 22i1 of differential amplifier 22. A voltage divider including resistors R1 and R12 provides bias and additional AC gain control for input terminal 22i1 of differential amplifier 22. Horizontal dynamic focus signals produced at terminal 18H of deflection processor 18, contain, or are associated with, a retrace parabola. The retrace parabola is removed from the horizontal dynamic focus signals in order to limit the bandwidth of the signals so that following slew-rate-limited circuits can respond usefully. The horizontal rate dynamic focus signals are applied from output terminal 18H of deflection processor 18 to an input port 24i of a retrace parabola removal circuit 24. The retrace parabola is removed from the horizontal dynamic focus signal by retrace parabola removal circuit 24, which includes transistors Q201 and Q202, diodes D201, D201, and D203, capacitors C201 and C202, and resistors R16, R201, R202, R203, R204 and R205.

In FIG. 1a, retrace parabola removal circuit 24, embodying an inventive feature, includes the series combination of a resistor R16, a coupling capacitor C201 and a resistor R205 electrically connected between input port 24i and the base of inverting amplifier transistor Q401. In the absence of switching transistor Q201, the horizontal-rate dynamic focus signals would be, or are, coupled from input port 24i to output port 24o with the positive peak portion of the signal at 24i inverted to a negative peak and clamped to near ground potential at terminal 24o. A source 24H of horizontal retrace pulses couples positive-going pulses by way of a resistor R204 and a capacitor C202, coupled in parallel, to the base of a grounded-emitter NPN transistor Q202. Transistor Q202 is nonconductive during the horizontal trace interval, and conductive during the horizontal retrace interval. When transistor Q202 is nonconductive during the horizontal trace interval, PNP transistor Q201 receives no base bias, and is nonconductive. During horizontal retrace, when transistor Q202 is conductive, a voltage divider including resistors R202 and R203 applies a forward bias to the base-emitter junction of transistor Q201, as a result of which transistor Q201 turns ON. The emitter current of transistor Q201 flows through a diode D201 to the +V1 supply voltage, so the emitter of transistor Q201 is held at a voltage which is one semiconductor junction voltage drop (one VBE) below or more negative than the +V1 source voltage. Transistor Q201 also saturates or achieves a state of little collector-to-emitter voltage drop, so the collector of Q201, and therefore the base voltage of inverter transistor Q401, rises to within one VBE of the +V1 source. There is then very little or no current flowing in resistor R401 because a voltage in excess of one semiconductor junction voltage drop (one VBE) is required to turn on inverter transistor Q401. With transistor Q401 off there is no current flow in collector resistor R402 and voltage 24o across Resistor R402 is zero. Thus, output voltage 24o of retrace parabola removal circuit 24 is set to a fixed voltage, at or very near ground, during horizontal retrace, regardless of the magnitude of the horizontal dynamic focus signal applied to input port 24i. A diode D202 and a resistor R201 together form a voltage divider that provides a reference voltage two (2) diode voltage drops (2 VBE) below or more negative than the +V1 voltage source applied to the anode of D201. Thus, the cathodes of diodes D202 and D203 are 2 VBE below +V1. Diode D203 together with capacitor C201 clamps the most positive portion of the horizontal dynamic focus waveform to the voltage at the emitter of transistor Q201. During horizontal retrace the voltage at the collector of transistor Q201 is fixed. The voltage at the junction terminal between resistor R16 and capacitor C201 decreases due to the undesired retrace pulse that is part of the horizontal dynamic focus waveform at terminal 24i. Resistor R205 limits current flow in capacitor C201 during horizontal retrace to prevent the voltage across capacitor C201 from changing to a value that is not related to the desired value resulting from peak detection. During horizontal trace the high input impedance of transistor Q401 prevents signal attenuation due to resistor R205. The voltage drops across diodes D202 and D203 cancel each other, and minimize changes in the clamped output signal due to temperature-dependent changes in the diode VBE. Similarly, diode 201 cancels the VBE drop in transistor Q401 such that the collector current from Q401 is zero during the most positive portion of the waveform at the base of transistor Q401. This clamps to ground the most negative portion of the waveform appearing in inverted form across resistor R402, including that portion or part eliminated during horizontal retrace by switching transistor Q201. The ground clamping action maintains a predictable direct voltage or DC if the horizontal dynamic focus waveform amplitude changes, as for example by bus control of Deflection Processor IC 18.

Figure 1C:
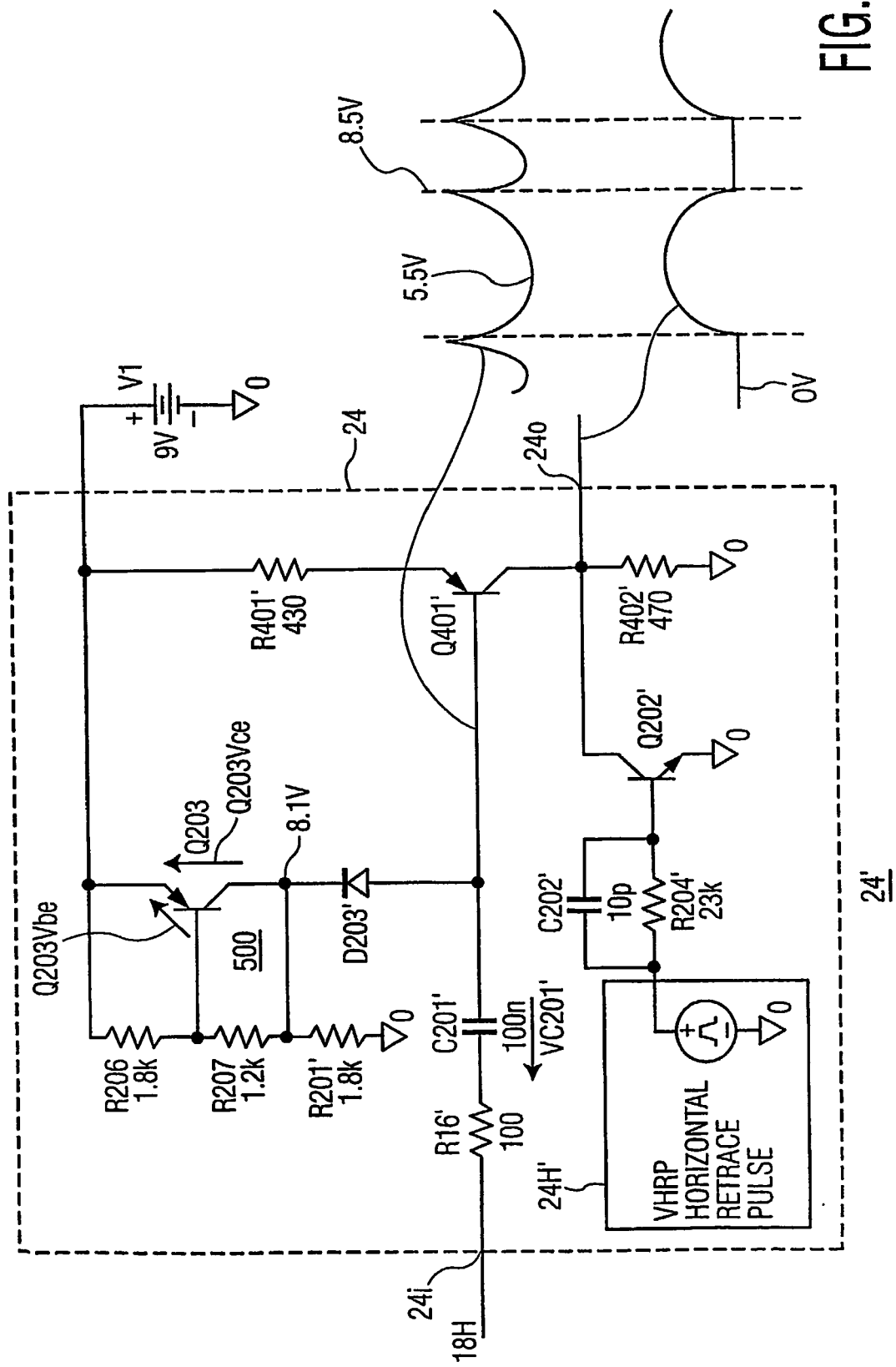
FIG. 1c is an alternative embodiment for the parabola voltage generating circuit of FIG. 1a, according to another aspect of the invention.

FIG. 1c illustrates a parabola removal circuit 24', that can be substituted in FIG. 1a for parabola removal circuit 24. Similar symbols and numerals in FIGS. 1a and 1c indicate similar items or functions. The horizontal dynamic focus voltage waveform from output 18H of deflection processor integrated circuit 18 of FIG. 1a contains both a desired parabola shaped waveform, during the horizontal trace time, and an undesired parabola shaped waveform, during the horizontal retrace time. The horizontal dynamic focus voltage waveform from output 18H is developed at input 24i of retrace removal circuit 24' of FIG. 1c coupled through a resistor R16' and a capacitor C201', coupled in series, to the anode of a diode D203' and also to a base of an inverting amplifier transistor Q401'. The cathode of diode D203' is coupled to a voltage reference circuit 500.

Circuit 500 includes a voltage divider formed by a pair of series coupled resistors R206 and R207. A junction terminal between resistors R206 and R207 is formed at a base of a transistor Q203 to provide negative feedback. The feedback causes a collector-to-emitter voltage, Q203Vce, of transistor Q203 to track a base-to-emitter voltage Q203Vbe of transistor Q203 according to the gain relationship: Q203Vce/Q203Vbe=(R206+R207)/R206. The symbols Q203Vce and Q203Vbe in the equation indicate the corresponding values of the items. The values of resistors R206 and R207 can be selected for values of gain greater than one. A collector resistor R201' of transistor Q203 supplies a return to ground for currents either through transistor Q203, resistors R206 and R207 or diode D203.

Capacitor C201' and diode D203' act as a peak detector such that during the initial cycles of the waveform at terminal 24i, capacitor C201' will charge to have, across capacitor C201', an average voltage VC201'. As a result, the positive peaks of the waveform at the base of transistor Q401' are at a level one silicon semiconductor junction (Vbe) voltage above the collector voltage of transistor Q203 developed across resistor R201'. The collector voltage of transistor Q203 is, in turn, below a 9 volt supply voltage V1, developed at the emitter of transistor Q203, by the value of collector-to-emitter voltage Q203Vce. The voltage at the emitter of transistor Q401' will be 1 Vbe above transistor Q401' base voltage.

To prevent current flow in transistor Q401' and a collector resistor R402', the voltage across resistor R401' has to be near zero. Therefore, the value of resistor R207 is selected so that collector-to-emitter voltage Q203Vce is equal to the sum of the voltage across diode D203' and the turn on threshold voltage of transistor Q401'. This sum voltage is slightly less than 2 Vbe because the turn on threshold base-emitter voltage of transistor Q401' is less than the value to fully turn on transistor Q401'.

The waveform across resistor R402' at terminal 24o will appear inverted relative to that at terminal 24i with the inverted peaks at ground potential. If the amplitude of the waveform at terminal 24i is changed or adjusted, the inverted peaks appearing at terminal 24o will remain fixed at ground potential and the positive going amplitude will change with respect to this ground reference.

As the circuit operating temperature changes, the voltage across transistor Q203 will change so as to cancel or compensate the changes in the voltages across diode D203' and in the base-emitter voltage of transistor Q401' such that the inverted peak ground clamp at terminal 24o remains within 0.1 volts of ground. During horizontal retrace, a switching transistor Q202' is turned on via a positive horizontal retrace pulse at source 24H'. A resistor R204' limits base current to transistor Q202' during the pulse and a capacitor C202' aids in turning transistor Q202' off quickly from a saturated turn on state at the end of the retrace pulse. During the retrace pulse, current from transistor Q401' that would result from the operation of transistor Q401' that inverts the unwanted retrace parabola is diverted to ground via transistor Q202' so that ground voltage is maintained at output terminal 24o. Transistor Q401' isolates the peak detecting and clamping portion of circuit 24', that includes diode D203' and capacitor C201', from the parabola removal portion, that includes transistor Q202' so that the voltage across capacitor C201' is advantageously, unaffected by the operation of transistor Q202'.

The horizontal dynamic focus signals with retrace parabola removed are generated at an output port 24o of retrace parabola removal circuit 24 of FIG. 1a, and are applied to the base of an inverting amplifier including PNP transistor Q401 and resistors R401 and R402. The amplified horizontal dynamic focus signals (with retrace parabola removed) are capacitively coupled from the collector of transistor Q401 by way of the series-parallel combination of an AC gain determining resistor R17 and capacitors C24 and C401 to the second input port 22i2 of differential amplifier 22. Differential amplifier 22 produces collector currents from both transistors which are related to the combination of the vertical and horizontal dynamic focus signals. The currents in the collector of transistor Q6 flow to direct voltage supply V1 without any effect. The current flow in the collector of Q5 represents the desired combined dynamic focus signals.

The "dynamic focus amplifier" designated generally as 17 in FIG. 1a includes differential amplifier 22, a Q1 Protection Circuit designated as a block 25, a Q1 Bias Detector circuit 32, feedback components R2 and C504, direct-current (DC) gain determining resistors R5, R11, and R12, vertical gain determining components R301, C301, R11, and R12, horizontal gain determining components C401, C24, and R17, and surge limiting resistors R503 and R25, all of which are discussed below. Terminal 17o is the output port of the dynamic focus amplifier 17.

A transistor Q20 of FIG. 1a is connected in a cascode arrangement with transistor Q5 of differential amplifier 22, with a low-value surge-protection resistor R506 therebetween. Transistor Q20 is a high-voltage transistor with low current gain and high voltage gain. The base of transistor Q20 is connected by a surge protection resistor R25 to direct voltage source V1, so the emitter of transistor Q20 can never rise above voltage V1. This arrangement also maintains constant voltage at the collector of transistor Q5, so there is no voltage change at the collector which can be coupled through the collector-to-base "Miller" capacitance to act as degenerative feedback at higher frequencies, so that transistor Q5 maintains a broad bandwidth.

Transistors Q1 and Q20 of FIG. 1a, and their ancillary components, together constitute a portion of high-voltage dynamic focus signal amplifier 17 for amplification of the combined dynamic focus signals. The load on the dynamic focus signal amplifier 17 is largely capacitive and equal to the parallel combination of capacitors C602, Cwire, and CT1 in the CRT(s) which is(are) driven with amplified dynamic focus signal. This parallel capacitance is charged through transistor Q1 and discharged through transistor Q20. In FIG. 1a, the collector of NPN transistor Q1 is connected by way of a diode D501 to receive supply voltage V2, and its emitter is connected by way of a resistor R501 and a zener diode D4 to the collector of transistor Q20. The base of transistor Q1 is connected by a conductor 60 to the collector of transistor Q20. The base of transistor Q1 is also connected by way of a resistor R502 to the junction of a capacitor C501 and the cathode of a diode D502. The other end of capacitor C501, and the cathode of a zener diode D503, are connected to the junction of resistor R501 with the anode of zener diode D4. The cathode of diode D502 and the anode of zener diode D503 are connected to output terminal 17o of Q1 bias detector 32. Resistor R2 in parallel with capacitor C504 provide degenerative feedback from a location near the output terminal 17o to input port 22i2 of differential amplifier 22.

In operation of dynamic focus signal amplifier 17 of FIG. 1a, the collector current of transistor Q5 is coupled through The emitter-to-collector path of transistor Q20, diode D4, capacitor C501 and diode D502 to the output 17o of dynamic focus amplifier 17. As a result of the current flow from transistor Q20 to output terminal 17o, capacitor C501 charges. The charging continues until the zener or breakdown voltage of zener diode D503 is reached, after which time D503 conducts so as to hold the voltage across capacitor C501 constant and equal to the zener voltage. A small fraction of the collector current of Q20 flows through resistor R502. During conduction of collector current in transistor Q20, transistor Q1 is maintained OFF or nonconductive because the voltage drop across zener diode D4 reverse-biases the base-emitter junction of transistor Q1.

When collector current in transistor Q20l of FIG. 1a decreases to zero during a portion of the operating cycle of dynamic focus signal amplifier 17, transistor Q1 is turned ON or rendered conductive by discharge of capacitor C501 through resistor R502, the base-emitter junction of transistor Q1, and resistor R501 back to capacitor C501. With Q1 conductive, a substantial Q current tends to flow from supply V2 through diode D501, the collector-to-emitter path of transistor Q1, resistor R501, and forward-biased diode D503 to the amplifier output terminal 17o. Overcurrent damage to transistor Q1 is prevented by a feedback voltage developed across emitter resistor R501, which limits the collector current to a value established by the zener voltage of diode D4 (minus one base-emitter junction voltage) felt across the emitter resistor R501, so that Q1 operates at constant current when the zener voltage is reached. Capacitor C501 stores sufficient charge to keep Q1 ON during that entire portion of the amplifier cycle during which Q20 is OFF, and also to keep Q1 ON when the collector-to-emitter voltage of Q1 is low. This allows the maximum positive amplifier voltage to closely approach the voltage of supply V2. Resistor R1, connected between the positive V2 supply and output terminal 17o, precharges capacitor C501 at start-up so that the cyclic AC pumping operation can start. Diode D501 in conjunction with resistor R502 tend to protect transistor Q1 from overcurrent through its collector-to-base junction in the event of an internal arc in picture tube 12 between the high voltage or ultor terminal 12U and the focus terminal 12F.

Amplifier 17 of FIG. 1amay be considered to be a high voltage operational amplifier, at least from the point of view of its output terminal 17o. In this operational amplifier, resistor R2 and capacitor C504 provide feedback from output to input, and resistors R5, R11, and R12 set the direct (DC) operating point. Resistor R17 and capacitor C24 set the dynamic or AC gain for horizontal-rate dynamic focus signals, while resistors R301, R11, and R12 together with capacitor C301 set the dynamic or AC gain for vertical-rate dynamic focus signals.

The amplified combined vertical and horizontal dynamic bias signals produced at output port 17o of Q1 Bias Detector 32 of FIG. 1a may be viewed as being produced by a low-impedance source. The signals are applied from port 17o through a surge limiting resistor R503 to a first input port $34i_1$ of a beam current load sensing focus tracking circuit 34 ("combining" circuit 34). A second input port $34i_2$ is connected to the ultor terminal 12U of picture tube 12, for receiving the ultor voltage. An output port 34o of beam current load sensing focus tracking or combining circuit 34 is connected to input port 26i1 of focus control block 26, and possibly to other corresponding focus controls associated with other picture tubes than picture tube 12, all illustrated together as a block 36. A cost saving according to one aspect of the invention is achieved over regulated high voltage sources by allowing the high voltage to vary in response to beam current. Thus, high voltage source 49 is not regulated.

As illustrated in FIG. 1a, a resistor R601 is connected in parallel with a capacitor C601, and the parallel combination of R601 with C601 is connected at one end to input port $34i_1$ of combining circuit 34. The other end of the parallel combination of R601 with C601 is connected to output port 34o of combining circuit 34. Combining circuit 34 also contains the series combination of a resistor R602 with a capacitor C602, and one end of the series combination is connected to second input port $34i_2$, while the other end of the series combination is connected to output port 34o.

Beam current load sensing focus tracking circuit 34 of FIG. 1a may be viewed as a frequency-sensitive combiner, which combines the combined vertical and horizontal dynamic focus signals applied to its first input terminal $34i_1$ with components of the high voltage applied to its second input port $34i_2$. The resulting combined signals are applied to input port 26i1 of focus control block 26 for combination with a "static" component of the focus voltage.

The focus control 26 and the beam current load sensing focus tracking circuit 34 of FIG. 1a can be made by using the following values of components

| R101 | 50    | Megohms    |
|------|-------|------------|
| R102 | 80    | Megohms    |
| R601 | 5.6   | Megohms    |
| R602 | 940   | Kilohms    |
| C101 | 1000  | picofarads |
| C601 | 470   | picofarads |
| C602 | 2[00  | picofarads |

The stray wiring capacitance is designated as $C_{wire}$ and has a value of 10 picofarads, and the capacitance CT1 of the focus electrode of a single picture tube, such as picture tube 12, is about 25 picofarads. The output impedance of the Q1 Bias Detector 32 and the resistance of R503 are ignored as being too small relative to other values to affect the results. Those skilled in the art will recognize that the series capacitor C602 connected between second input port $34i_2$ and output terminal 34o of combining circuit 34 allows only variations or changes ("sag") in the high voltage to be coupled to output port 34o. Similarly, the presence of capacitor C101 connected between input port 26i1 of focus control block 26 and tap 28t of voltage divider 28 prevents the coupling of direct signal components to the tap 28t. Capacitor C101 together with the parallel combination of resistors R101 and R102 constitutes a high-pass filter having a cutoff or break frequency of about 5 Hertz (Hz).

Figure 2:
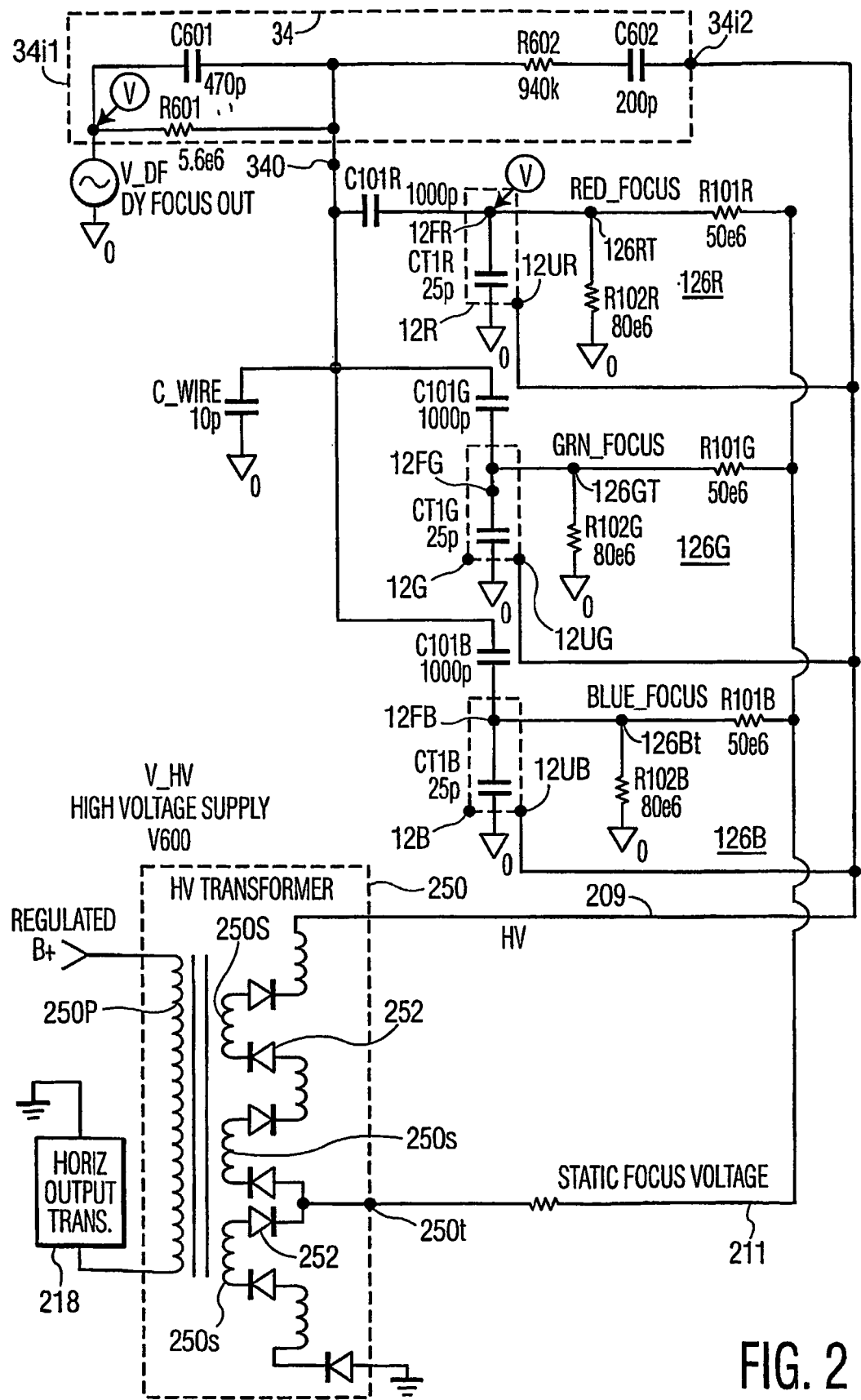
FIG. 2 is a simplified equivalent diagram of an arrangement in which three picture tubes are used.

FIG. 2 is a simplified equivalent circuit or schematic diagram of a television or video display apparatus according to an aspect of the invention in which red, green, and blue cathode-ray or picture tubes are used for the display. The red, green and blue picture tubes are illustrated as blocks 12R, 12G, and 12B, respectively, their ultor terminals are identified as 12UR, 12UG, and 12UB, respectively, and their focus terminals are identified as 12FR, 12FG, and 12FB, respectively. In FIG. 2, elements corresponding to those of FIG. 1a are designated by like reference numerals. Elements R101, R102, and C101 have appended letters R, G or B to identify corresponding elements associated with the red, green and blue cathode-ray tube displays, respectively. In FIG. 2, a source V_DF represents the combined vertical and horizontal dynamic focus signal source applied to first input port $34i_1$ of combiner 34.

Source V_HV of FIG. 2 represents the high or ultor supply voltage source. Voltage source V_HV includes an integrated transformer 250 with a primary winding 250p. Primary winding 250p is connected at one end to a source of regulated B+ and at the other end to a block representing a switching horizontal output transistor. Transformer 250 also includes a distributed secondary winding, including a plurality of windings, each of which is designated 250s. The distributed secondary winding of transformer 250 is grounded at one end. A set of diodes, some of which are designated as 252, is interspersed between the winding secondary sections 250s, and act to rectify the high voltage produced on an output conductor illustrated as 209. A "static" focus voltage is produced at a tap 250t of transformer 250. In one embodiment of the invention, tap 250t is a ⅓ tap relative to the ultor voltage, so that the static focus voltage produced at tap 250t is about ⅓ of the high voltage produced on conductor 209, and remains at a fixed percentage of the ultor voltage.

The high or ultor voltage V_HV is coupled by way of conductor 209 to terminal 34i2 of combining circuit 34, and to the ultor connections 12UR, 12UG, and 12UB of the red, green, and blue picture tubes 12R, 12G, and 12B, respectively, of FIG. 2, so that combiner 34 and all the cathode-ray tubes are fed in common from the ultor supply V_HV. The static focus voltage is coupled from tap 250t by way of a conductor illustrated as 211 to the red, blue and green focus terminals 12FR, 12FG, and 12FB, respectively, by resistive voltage dividers 126R, 126G, and 126B, respectively. Voltage divider 126R includes series resistor R101R and shunt resistor R102R having a tap 126Rt therebetween. Tap 126Rt is coupled to red picture tube focus terminal 12FR. Resistor R101R has a value of 50 Megohms and resistor R102R has a value of 80 Megohms. Similarly, voltage divider 126G includes series resistor R101G and shunt resistor R102G having a tap 126Gt therebetween. Tap 126Gt is coupled to green picture tube focus terminal 12FG. Resistor R101G has a value of 50 Megohms, and resistor R102G has a value of 80 Megohms. Also, voltage divider 126B includes series resistor R101B and shunt resistor R102B having a tap 126Bt therebetween. Tap 126Bt is coupled to blue picture tube focus terminal 12FB. Resistor R101B has a value of 50 Megohms and resistor R102B has a value of 80 Megohms. Thus, each focus terminal 12FR, 12FG, and 12FB of the red, green, and blue picture tubes "sees" its static focus voltage as being sourced from an impedance of about 30 Megohms, just as in the arrangement of FIG. 1a.

Output terminal 34o of combiner 34 of FIG. 2 is coupled to each of the red, green and blue focus terminals 12FR, 12FG, and 12FB, respectively, by a coupling capacitor C101R, C101G, and C101B, respectively. Each of capacitors C101R, C101G, and C101B has a value of 1000 pF. The capacitance of the red, green and blue picture tubes are designated as CT1R, CT1G, and CT1B, respectively.

What is claimed is:

1. A waveform generator, comprising:
   a source of a periodic input correction signal;
   a capacitor;
   a first semiconductor switch coupled to said capacitor and responsive to a signal at a first reference level for developing a direct current voltage in said capacitor that level shifts said periodic, input correction signal by an amount determined in accordance with said first reference level;
   a source of a periodic switch control signal; and
   a second semiconductor switch responsive to said level shifted periodic input correction signal and to said periodic switch control signal for generating a periodic output dynamic correction signal having a frequency related to a deflection frequency and a waveform portion, controlled by an operation of said second semiconductor switch, said waveform portion occurring, during a corresponding portion of a period of said output dynamic correction signal, said dynamic correction signal being coupled to a cathode ray tube to vary a field in a beam path of an electron beam of said cathode ray tube for providing dynamic correction.

2. The waveform generator according to claim 1, wherein said first semiconductor switch establishes a peak level of said dynamic output correction signal at a level determined in accordance with said first reference level.

3. The waveform generator according to claim 2, wherein said waveform portion of said dynamic output correction signal occurs between an end of a trace portion and a beginning of an immediately following trace portion of said dynamic output correction signal.

4. The waveform generator according to claim 1, wherein said second semiconductor switch removes from said dynamic correction signal a parasitic portion of said periodic input correction signal that occurs during retrace.

5. The waveform generator according to claim 1, wherein said first semiconductor switch clamps a peak level of said dynamic output correction signal that occurs at an end of trace to a constant level, in accordance with said first reference level.

6. The waveform generator according to claim 5, wherein a peak-to-peak amplitude of said dynamic output correction signal is selectable and wherein said end of trace portion of said dynamic correction signal is clamped to said constant level that is the same for different selections of said peak-to-peak amplitude.

7. The waveform generator according to claim 1, wherein said dynamic output correction signal varies in a parabolic manner, during trace.

8. The waveform generator according to claim 1, wherein said first semiconductor switch excludes a transistor.

9. The waveform generator according to claim 1, wherein said first semiconductor switch comprises a peak rectifier and said second semiconductor switch comprises a transistor responsive to a retrace interval indicative signal.

10. A waveform generator for providing dynamic correction, comprising:
    a capacitor;
    a source of a periodic input signal at a frequency related to a deflection frequency coupled to a first terminal of said capacitor;
    a first semiconductor switch responsive to a signal at a first reference level and coupled to a second terminal of said capacitor for periodically clamping a peak level of a signal developed at said second terminal;

a source of a periodic switch control signal; and a second semiconductor switch responsive to a signal at a second reference level and to said periodic switch control signal for periodically clamping said signal developed at said second terminal, in accordance with said second reference level, said signal developed at said second terminal being coupled to a cathode ray tube to vary a field in a beam path of an electron beam of said cathode ray tube for providing dynamic correction.

11. The waveform generator according to claim 10, wherein said second semiconductor switch removes from said signal developed at said second terminal a parasitic portion of said periodic input signal that occurs during retrace.

12. A waveform generator, comprising:

a source of a periodic input correction signal;

a capacitor;

a first semiconductor switch coupled to said capacitor and responsive to a signal at a reference level for developing a direct current voltage in said capacitor that level shifts said periodic, input correction signal by an amount determined in accordance with said first reference level;

an amplifier having an input responsive to said level shifted input correction signal for applying said level shifted input correction signal to an output of said amplifier;

a source of a periodic switch control signal; and a second semiconductor switch responsive to said periodic switch control signal and to said level shifted input correction signal and coupled to said output of said amplifier that isolates said second semiconductor switch from said capacitor for generating a periodic output dynamic correction signal having a first portion, during a first portion of a period of said input correction signal, that is controlled in accordance with said periodic input correction signal, and a second portion, during a second portion of said period of said input correction signal, that is controlled, in accordance with an operation of said second semiconductor switch, said dynamic correction signal being coupled to a cathode ray tube to vary a field in a beam path of an electron beam of said cathode ray tube for providing dynamic correction.

* * * * *